United States Patent Office 3,284,367
Patented Nov. 8, 1966

3,284,367
SOLVENT MIXTURES AND METHODS FOR THE STORAGE OF OZONE
Francis Mahieux, Gennevilliers, France, assignor to l'Air Liquide, Societe Anonyme pour l'Etude et l'Exploitation des Procedes Georges Claude
No Drawing. Filed Aug. 23, 1963, Ser. No. 304,255
Claims priority, application France, Aug. 31, 1962, 908,333, Patent 1,344,944
4 Claims. (Cl. 252—364)

The present invention relates to the use of mixtures of solvents for the dissolution and storage of ozone at low temperature. These mixtures make is possible to use certain solvents at temperatures below their freezing point, and thus to increase the solubility of the ozone with respect to each of the constituents of the mixture, and consequently to obtain much higher ozone concentrations.

One process employed for dissolving ozone at low temperature in a liquid solvent at the selected dissolution temperature is described in French Patent No. 1,246,273 of October 6, 1959 and in its first certificate of addition dated October 10, 1960.

The solvent mixtures of the present invention, which can be used in a process for the conservation of ozone in a relatively stable and if desired fairly concentrated form, preferably dissolved at low temperature, are mixtures of trichlorofluoromethane, of the formula $CCl_3F$, and 1,2-dichloro-1,1,2,2,-tetrafluoroethane, with the formula $CClF_2$—$CClF_2$, or mixtures of trichlorofluoromethane and monochlorodifluoromethane, with the formula $CHClF_2$, or mixtures of 1,1,2-trichloro-1,2,2,-trifluoroethane with the formula $CCl_2F$—$CClF_2$, and 1,2-dichloro-1,1,2,2-tetrafluorethane, or mixtures of trichloromethane with the formula $CHCl_3$ and carbon tetrachloride with the formual $CCl_4$.

It has been found that the system formed by carbon tetrachloride, the solidification point of which is relatively high (−23° C.), in the proportion of 49.4% by weight, and trichloromethane solidifying at −63° C., in the proportion of 50.6% by weight, constitutes a eutectic with a solidification points towards −80° C. Similarly, the mixture of 1,1,2-trichloro-1,2,2-trifluoroethane, known under the name of "Freon 113" and 1,2-dichloro-1,1,2,2-tetrafluoroethane, known commercially under the name of "Freon 114" is still liquid at −63° C., for a proportion of equal volumes, in liquid volume at this temperature, the freezing point of one of the constituents, "Freon 113," being equal to −35° C.

The mixture of trichlorofluoromethane, known as "Freon 11" and of "Freon 114," the 1,2-dichloro-1,1,2,2-tetrafluoroethane, is still liquid above −110° C. for a proportion of 5 liquid volumes of "Freon 114" to 2 volumes of "Freon 11" at this temperature; the freezing point of the two constituents are respectively −111° C. for trichlorofluoromethane and −94° C. for 1,2-dichloro-1,1,2,2-tetrafluoroethane.

The solubility of ozone has been studied in the solvents referred to above, as well as in the mixture of trichlorofluoromethane in the proportion of 4 parts by volume to 2 parts by volume of difluorochloromethane ($CHClF_2$), known under the name of "Freon 22," at a temperature of −110° C.

The following table gives the Bunsen solubility coefficients $S^T$ at various temperatures of ozone in mixtures of solvents according to the present invention. The Bunsen coefficient is the volume of gas, brought to normal conditions, dissolved at a pressure of 1,013 bars in the unit of volume of solvent.

In practice, the gaseous ozone is always diluted by another gas, such as oxygen or air, which has served for the preparation thereof. The index $p$ indicates the coefficient corresponding to the partial pressure of the ozone, i.e., 4 to 6% by volume, in the tests of the present invention. The index 1 indicates the coefficient corresponding to a gas of 100% ozone.

| Nature of Solvents | "Freon 113"/"Freon 114" | "Freon 11"/"Freon 114" | "Freon 11"/"Freon 22" | $CHCl_3/CCl_4$ |
| --- | --- | --- | --- | --- |
| Proportion of solvents | 5 volumes $CF_{113}$, 4 volumes $CF_{114}$ at −63° C. | 2 volumes $CF_{11}$, 5 volumes $CF_{114}$ at −110° C. | 4 volumes $CF_{11}$, 2 volumes $CF_{22}$ at −110° C. | 3, 4 volumes $CHCl_3$, 2, 4 volumes $CCl_4$ at 20° C. |
| Temperature T of solubilisation | −63° C. | −110° C. | −110° C. | −63° C. |
| $S_p^T$ | 1.56 to 1.59 | 13 to 16 | 16 to 19 | 1.14 to 1.19. |
| $S_1^T$ | 32±1 | 2270±80 | 2750±70 | 25.5±0.5. |

The results are particularly interesting for the system comprising trichlorofluoromethane and 1,2-dichloro-1,1,2,2-tetrafluoroethane, for which the solubility of the ozone in "Freon 11" at −110° C. is increased to considerable proportions of the order of 40%; the Bunsen coefficient for the pure trichloromonofluoromethane at this temperature being equal to 1610.

The increase in the solubility of the ozone makes its possible to obtain much higher ozone concentrations by this technique of dissolving ozone at −110° C., just above its liquefaction temperature.

Moreover, trichlorofluoromethane and 1,2-dichloro-1,1,2,2,-tetrafluoroethane are solvents of not very high vapour tension and can even be stored in glass bottles with a tin sealing cap of the type used on carbonated beverage bottles.

By way of non-limitative example, a total pressure $P_1 = 4$ kg./cm.$^2$ was obtained with such a mixture in the filling of a glass bottle (where $V/V_1 = 2$, V representing the volume of the bottle and $V_1$ the solution volume at −110° C.). The initial concentration of ozone was 16%, i.e., a partial pressure of $P_{03} = 650$ millibars. The solubility coefficient, starting with 3.5% ozone at atmospheric pressure, was 6 at −110° C.

The solutions of ozone in the solvents at low temperature can be used as ozone sources in all the uses of the latter. They can serve for the ozonisation of a fluid, liquid or gaseous medium for the purification thereof. These solutions can also be employed as fuel in rockets.

On a smaller scale, these solutions are suitable for generating ozone in analytical chemistry particularly in organic chemistry.

The ozone solutions according to the invention can also serve as sources of active oxygen and be used to replace hydrogen peroxide in all the applications where the latter serves as an active oxygen source, particularly the bleaching and cleaning of textiles.

What I claim is:
1. A solution of ozone in a liquid solvent mixture consisting essentially of about five parts by volume of 1,2-dichloro-1,1,2,2-tetrafluoroethane and about two parts by volume of trichlorofluoromethane.

2. A solution of ozone in a liquid solvent mixture consisting essentially of about four parts by volume of trichlorofluoromethane and about two parts by volume of difluorochloromethane.

3. A solution of ozone in a liquid solvent mixture consisting essentially of about five parts by volume of 1,1,2-trichloro-1,2,2-trifluoroethane and about four parts by volume of 1,2-dichloro-1,1,2,2-tetrafluoroethane.

4. A solution of ozone in a liquid solvent mixture consisting essentially of about 3.4 parts by volume of trichloromethane and about 2.4 parts by volume of carbon tetrachloride.

References Cited by the Examiner

UNITED STATES PATENTS

| | | | |
|---|---|---|---|
| 2,987,438 | 6/1961 | Ashkenaz | 252—67 XR |
| 2,992,540 | 6/1961 | Grosse et al. | 23—222 XR |
| 3,081,157 | 3/1963 | Gordon et al. | 23—221 |

FOREIGN PATENTS 1,246,273  10/1960  France.

OTHER REFERENCES

Downing et al.; "Formulation of Aerosol," Soap and Sanitary Chemicals, September 1953 (pages 142–149 and 153 and 155 relied on).

"Freon," Technical Bulletin B-2, E. I. du Pont de Nemours and Company, Del. (1957) (pages 5 and 6 relied on).

Haase et al.; "Azeotropic Aerosol Propellants," Soap and Chemical Specialties, August 1964 (pages 105–111 relied on).

Sokol: "Soluable Gases as Propellants," Soap and Chemical Specialties, April 1964, pages 147, 148 and 158 relied on.

LEON D. ROSDOL, *Primary Examiner.*

JULIUS GREENWALD, *Examiner.*

J. T. FEDIGAN, *Assistant Examiner.*